(12) United States Patent
Verstraelen et al.

(10) Patent No.: US 7,339,585 B2
(45) Date of Patent: Mar. 4, 2008

(54) METHOD AND APPARATUS FOR VISUALIZATION OF BIOLOGICAL STRUCTURES WITH USE OF 3D POSITION INFORMATION FROM SEGMENTATION RESULTS

(75) Inventors: Boudewijn Joseph Angelus Verstraelen, Lanaken (BE); Sebastiaan Paul Verstraelen, Lanaken (BE)

(73) Assignee: Pie Medical Imaging B.V., Maastricht (NL)

( * ) Notice: Subject to any disclaimer, the term of this patent is extended or adjusted under 35 U.S.C. 154(b) by 541 days.

(21) Appl. No.: 10/894,202

(22) Filed: Jul. 19, 2004

(65) Prior Publication Data

US 2006/0034511 A1 Feb. 16, 2006

(51) Int. Cl.
*G06T 17/00* (2006.01)
(52) U.S. Cl. ...................................... 345/424
(58) Field of Classification Search ................ 345/424, 345/426; 382/254, 131, 173
See application file for complete search history.

(56) References Cited

U.S. PATENT DOCUMENTS

| | | | | |
|---|---|---|---|---|
| 5,768,413 A | * | 6/1998 | Levin et al. | 382/173 |
| 6,058,218 A | | 5/2000 | Cline | 382/254 |
| 6,563,941 B1 | * | 5/2003 | O'Donnell et al. | 382/131 |

OTHER PUBLICATIONS

"Improving Statistics for Hybrid Segmentation of High-Resolution Multichannel Images" by E.D. Angelini, C. Imielinska, Y. Jin and A. Laine; Columbia U.; Feb. 2002.
"Edge-Based Segmentation", by Milan Sonka et al. Image Processing, Analysis and Machine Vision, Chapman & Hall (1995); Chapter 5.2.
"Comparison Between Manual and Semiautomated Analysis of Left Ventricular Volume Parameters from Short-Axis MR Images"; Rob J. Van der Geest et al.; 1997.

* cited by examiner

*Primary Examiner*—Almis Jankus
(74) *Attorney, Agent, or Firm*—Gordon & Jacobson, PC

(57) ABSTRACT

A data processing methodology and corresponding apparatus for visualizing the characteristics of a particular object volume in an overall medical/biological environment receives a source image data set pertaining to the overall environment. First and second contour surfaces within the environment are established which collectively define a target object volume. By way of segmenting, all information pertaining to structures outside the target object volume are excluded from the image data. A visual representation of the target object based on nonexcluded information is displayed. In particular, the method establishes i) the second contour surface through combining both voxel intensities and relative positions among voxel subsets, and ii) a target volume by excluding all data outside the outer surface and inside the inner surface (which allows non-uniform spacing between the first and second contour surfaces). The second contour surface is used as a discriminative for the segmenting.

15 Claims, 3 Drawing Sheets

METHOD AND APPARATUS FOR VISUALIZATION OF BIOLOGICAL STRUCTURES WITH USE OF 3D POSITION INFORMATION FROM SEGMENTATION RESULTS

BACKGROUND OF THE INVENTION

1. Field of the Invention

The invention relates to a method for visualizing a particular surface of an object volume in an overall medical/biological environment, through establishing at least a first and a second contour surface within the above environment that collectively define a target object volume and which method allows to selectively exclude information pertaining to structures outside said target object volume.

2. Related Art

Medical/biological MR (magnetic resonance) diagnostics, medical/biological CT (computer tomography) and US (ultrasonic) technologies have all recognized the importance of visualizing only limited target object volumes while excluding volumes out-of-interest. A relevant but non-limiting example is the visualizing of coronary arteries by excluding information outside the heart's wall that could obscure these objects of interest (e.g., in this case both the interior ventricles of the human heart and also structures that lie outside the immediate neighborhood of the heart). In this example, when visualizing a beating heart, the contour data that identify the volume-of-interest will be depending on the phase of the heart's beat cycle. Therefore, synchronizing to an ECG (electrocardiogram) will be required for visualizing successive slices that belong to respectively selected phases in the cycle. By themselves, methods for executing such synchronizing are widely known in the medical profession.

U.S. Pat. No. 6,058,218 to Cline discloses the applying of a threshold level to the data, smoothing the thresholded data set, dilating the smoothed data set, excluding certain data from the original data set as based on the smoothing result, and imaging the non-excluded data. Cline's masking/dilating operations substantially reduce voxels intensities to a binary value. Subsequently, the dilating is effected by subjecting the voxel environment to uniform binary operators. Now, the reference has recognized that often, starting from the inner contour of the heart will yield better results. Effectively, the prior art creates a watermark-surface, and thereafter effects the visualizing as being based substantially on voxels on both sides of the watermark. Through binarizing the image and using relatively simple operators, the versatility of the reference is limited, as will be discussed further hereinafter.

Indeed, the present inventors have recognized that the above procedure will in many instances render less accurate results where the various surfaces (inner versus outer) are to a certain degree running independently from each other. In the example of a human heart, the wall thickness may vary over an appreciable factor, and the uniform dilating process as discussed supra would thus be liable to underestimating the wall thickness in thicker places, and overestimate the thickness in thinner places.

SUMMARY TO THE INVENTION

In consequence, amongst other things, it is an object of the present invention to provide a data processing methodology (and corresponding data processing apparatus) that analyzes object volume data to identify find the two or more contour surfaces along mutually separate procedures, that could each be specifically tuned to the specific situation, such as through accounting specifically for various geometric properties of the contour surfaces, such as being convex, concave, or relatively flat.

Now therefore, according to one of its aspects, the invention involves a data processing methodology (and corresponding data processing apparatus) that establishes a contour surface through combining both multivalued voxel intensities and relative positions among voxel subsets, thereby allowing non-uniform spacing between said different contour surfaces, and furthermore by using such contour surface as a discriminative for said segmenting.

According to a preferred embodiment of the present invention, the data processing methodology (and corresponding data processing apparatus) translates the voxel intensities and relative positions may translate into first and second analog or discrete spatial intensity gradients among voxel subsets, such as those that are located along various lines, such as radial lines in a polar coordinate system. The procedure could furthermore be based upon a fuzzy-connectedness principle, where the finding of the continuity of contours and/or contour surfaces across slices will use both the actually measured intensity values and the relative locations of voxels under consideration. (Nearly)-equal values among adjacent voxels can indicate their lying on a particular contour. If the voxels are however relatively distant from each other, their actual intensities relative to the intensities of their respective neighbors may also give a clue in this respect. By themselves, various contour generating algorithms have been taught per se, as will be discussed hereinafter.

In a preferred embodiment of the invention, the content of a wall of e.g. a human heart is visualized by e.g. a three-dimensional (3D) rendering method or with projection methods like Maximum Intensity Projection (MIP). In another preferred embodiment the outside surface of the wall of e.g. a human heart is visualized as by looking from the outside to the wall of the heart by using 3D visualization methods.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

DETAILED DESCRIPTION OF PREFERRED EMBODIMENTS

For the purposes of description, a region between the two contour surfaces will be referred to hereinafter as the wall, such as a heart's wall or shell.

Figure 1:
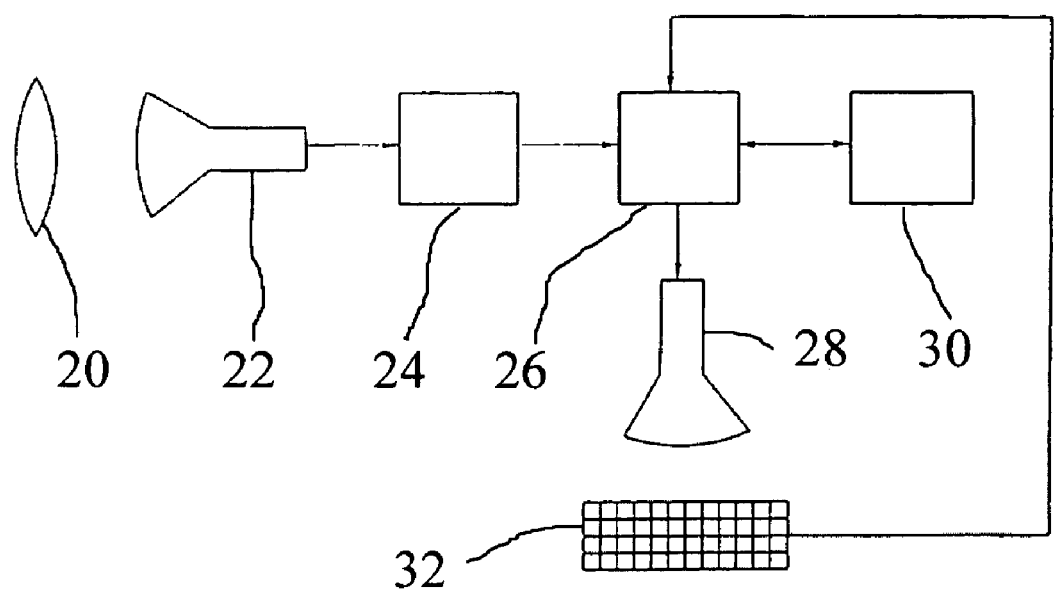
FIG. 1, a general 3D visualizing device.

FIG. 1 illustrates a typical 3D visualizing device. Herein, item 20 is a medical or other biological object, such as a part of a human body. Item 22 is a medical imaging system, such as an X-ray, MR or US device that provides a pattern of relative intensities or other quantitative data, such as represented by a gray-scale. Item 24 symbolizes an image-processing device that may execute various types of image enhancement or other data processing operations. Next, the image is processed in the data processing device 26, thereby resulting in the 3D-image-point (or voxel)-related data set that may subsequently be used for providing a doctor with an appropriate viewing region. These data are transiently stored in storage device 30, and are therein accessed for effecting a display on display screen 28. Through an appropriate user interface, such as exemplified by keyboard 32, and generally enhanced by mouse-type or other features not shown for clarity, a user person may select various image positions or directions, or select among various applicable data processing modalities. This selecting will be retrocoupled to device 26 for thereupon amending the display. If applicable, a particular imaged structure so found may be stored in memory such as for repetitive usage.

Figure 2:
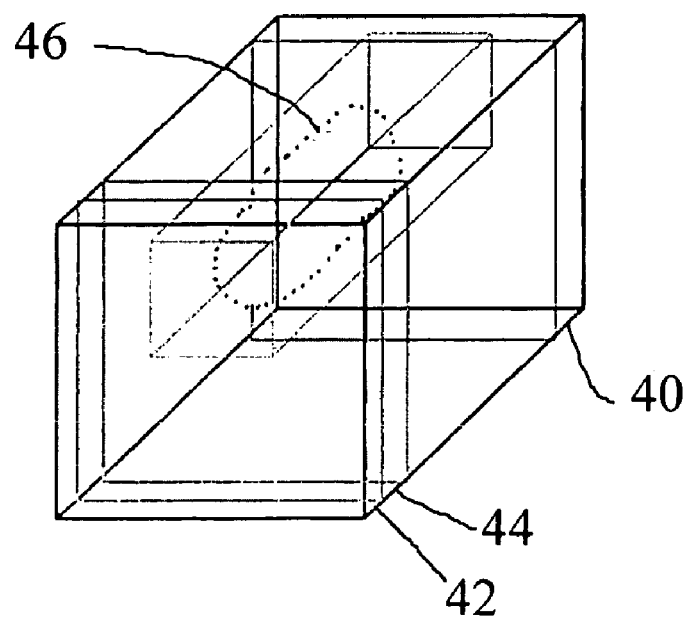
FIG. 2, a partial volume-of-interest in a larger 3D data set that contains the wall.

FIG. 2 illustrates a general medical/biological configuration. First, an overall medical environment represented by block 40 is subjected to a known diagnostic procedure, such as exemplified by MR or other 3D imaging technologies, including but not limited to CT and 3D US technologies. Such diagnostics will produce successive planes or slices 42, 44, . . . of voxels that each have a voxel parameter value. This value will generally depend on the properties such as density or composition of the local tissue or matter, such as distinguishing muscle, fat, blood, etc. Moreover, this parameter value can depend on the voxel position relative to the diagnostic system, inasmuch as the depth or other geometrical disposition within the body can more or less strongly influence the measurement sensitivity. For simplicity, individual voxels have not been shown, however. The overall surface or volume is generally constructed from a plurality of slices. Within block 40, the user may generally define a relatively smaller volume of interest than the whole block shown in FIG. 2, such as one that is expected to contain the heart and its immediate environment. Such defining may be based on intuitive or heuristic arguments. The heart 46 proper has by way of exemplary discrimination been shown as a volume that is surrounded by a dotted line. Now, the heart is a complex structure that contains an interior composed of a set blood-filled ventricles, the ventricle matter proper or myocardium, and the pericardium making up the exterior of the heart, which can comprise things like fatty material, various blood vessels such as coronaries and the aorta, etcetera. The various slices are measured in succession, whilst furthermore the heart is usually moving more or less periodically, and the diagnostic procedure has to account for such non-steady behavior.

Now, instead of so-called short axis slices as shown by way of example in FIG. 2, alternatively long axis slices can be used to find the inner and outer contours. In such case, a limited number of (for example, four (4)) long axis slices of a left ventricle would be sufficient to define the wall.

Figure 3:
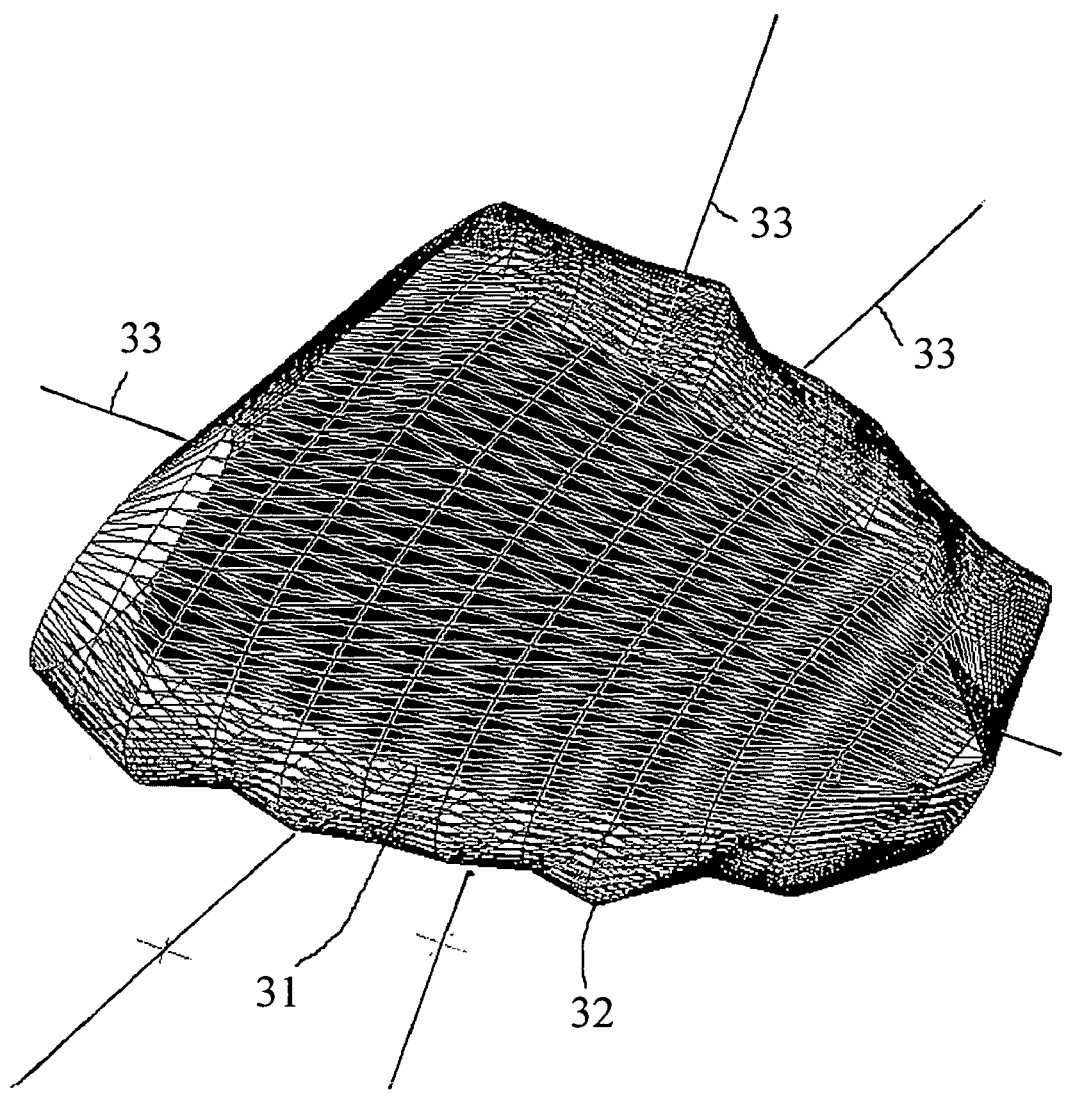
FIG. 3, an example of a set of inner and outer contours that collectively define a wall, in this case pertaining to a left ventricle human heart wall.

FIG. 3 shows the various inner and outer contours that result from the segmentation of the 3D data set of FIG. 2 with the inner contour transformed in a surface 31 and the outer contour shown as a wire model 32. These contours may collectively define a wall or shell of the object. Now, in a practical implementation, such as where the position of the cardiac wall is to be established, the automatic segmentation algorithm that is used to derive the endocardial contour can be described as a method to define a property described as the "hanging together-ness" (or fuzzy connectedness) of certain image elements (pixels or voxels) that take part in the constituting of an object, such as the left ventricle of the human heart. This operation can be performed in three dimensions by covering a plurality of slices. As input data the algorithm in question will extract various statistical parameters from the data set such as average density and standard variation thereof. Such parameters will then describe the object that is to be segmented. These parameters can be derived from an initial area that is located inside the heart ventricle. Note the earlier comment on the non-uniform translation function between object density and voxel intensity through the diagnostic geometry. Now, based on these input data, the algorithm will compute the above "hanging together-ness" quality of each voxel inside the Volume Of Interest (VOI) as per FIG. 2. In FIG. 3, lines 33X, 33Y, 33Z correspond with a three-dimensional coordinate system (x-, y- and z-axis, respectively) wherein the image may be translated or rotated for better visualization thereof.

Next, the fuzzy result so produced must be separated in order to classify the voxels into object voxels and non-object voxels. The separation of the two sets of object voxels is then fine-tuned which finally results in the endocardial contour (the inner edge of the heart's wall).

Next, the epicardial or outer contour is segmented on the basis of a radial minimum cost algorithm. As a seed or starting entity therefore the above detected endocardial contour or inner surface is used. From this endocardial contour a polar model is derived that contains an origin wherefrom radial lines originate. The origin can be found through some procedure that finds a center or gravity according to some suitable algorithm, and the standard number and spacing of radial lines starting therefrom, and the positioning of the voxels on such radial lines are selected according to a requirement protocol. Next, the polar model is used to resample the original image again; indeed, the original voxels are then translated to secondary voxels that are centered on such radial lines, such as by an interpolation procedure between voxels located near such radial line and/or near the particular secondary voxel in question. Now, based on the resampled image, dynamic sign determinations along each resampled image line are calculated. From a combination of the first and second spatial derivatives or differentials between the voxel values along such radial lines, a cost image is derived that contains a spatially defined cost function. Finally, through this spatial cost image a path is selected that is associated with minimum cost to thereby find a closed outer contour. In this way, combining both voxel intensities (voxel values) and relative positions (collectively yielding the first and second derivatives) among voxel subsets on such radial line the outer contour is found, thereby allowing for a possibly non-uniform spacing between an inner and outer contour. All of the above procedures may be executed fully automatically without human intervention for yielding a high-quality output without necessitating continual human intervention.

When both inner and outer contours have been established, the wall proper can be composed. On the one hand, this partial volume can now be used to optimize the visualization of the wall and its content. Alternatively, the partial volume can be used to acquire a new data set that has improved qualities to visualize the content of the wall, such as by directing the data acquisition specifically to the region-of-interest.

If further appropriate, after the detection of the epicardial (outer) contour, the latter can be extended in an outward direction to include besides the heart proper a region that can hold structures that are known to be outside the heart, but only at a limited distance from the detected epicardial contour, and furthermore, relevant in a medical/biological frame of mind. Useful cases are for instance coronaries and bypass grafts resulting from earlier medical treatments. Such extending may be done by simple local geometrical dilating as a uniform extension when the thickness of the extension layer may be estimated a priori: a contour position on a radial line will then immediate produce an extension position on the same radial line. Inasmuch as such extending corresponds usually to a relatively small fraction of the heart's overall size, a local procedure such as Cline's local dilating controlled by a binary operator could then be used. Note that this operator is not a person, but rather a mathematical expression formulated as being based upon voxel intensity values.

Another more refined method for such extending allows for spatially non-uniform extension of the contour. Such procedure could be the case when the extension is a uniform percentage of the distance between the center of gravity of the outer contour or the earlier used polar model origin to the outer contour, and taken along the radius. Possibly apart from the selection of the percentage itself, this is a purely local procedure, that could be performed through using an elementary extension of Cline's operator.

A still further alternative could be that the local extension were proportional to the local distance between the inner and outer contour, i.e., the local wall thickness. This may again be governed in the above polar model.

In a further refined method the outward extension of the outer contour is conditional to the dynamic sign determination that was part of the detection process of the outer contour, supra. In case of the left ventricle of the heart, this determined dynamic sign could identify the outer contour either as an outside wall of the heart or alternatively, as an inner separation wall such as the septum between the left ventricle and the right ventricle.

Now, when both inner and outer contours have been established, the wall proper of the object considered can be composed. On the one hand, the partial volume so constituted may now be used to optimize the selective visualization of the wall and its content. Alternatively, the partial volume can be used to acquire a newly measured data set that has improved qualities, to still better visualize the content of the wall. Such may be effected as by directing the secondary data acquisition operation more selectively to the region-of-interest only, or alternatively, by raising the resolution of the measurement proper.

Figure 4:
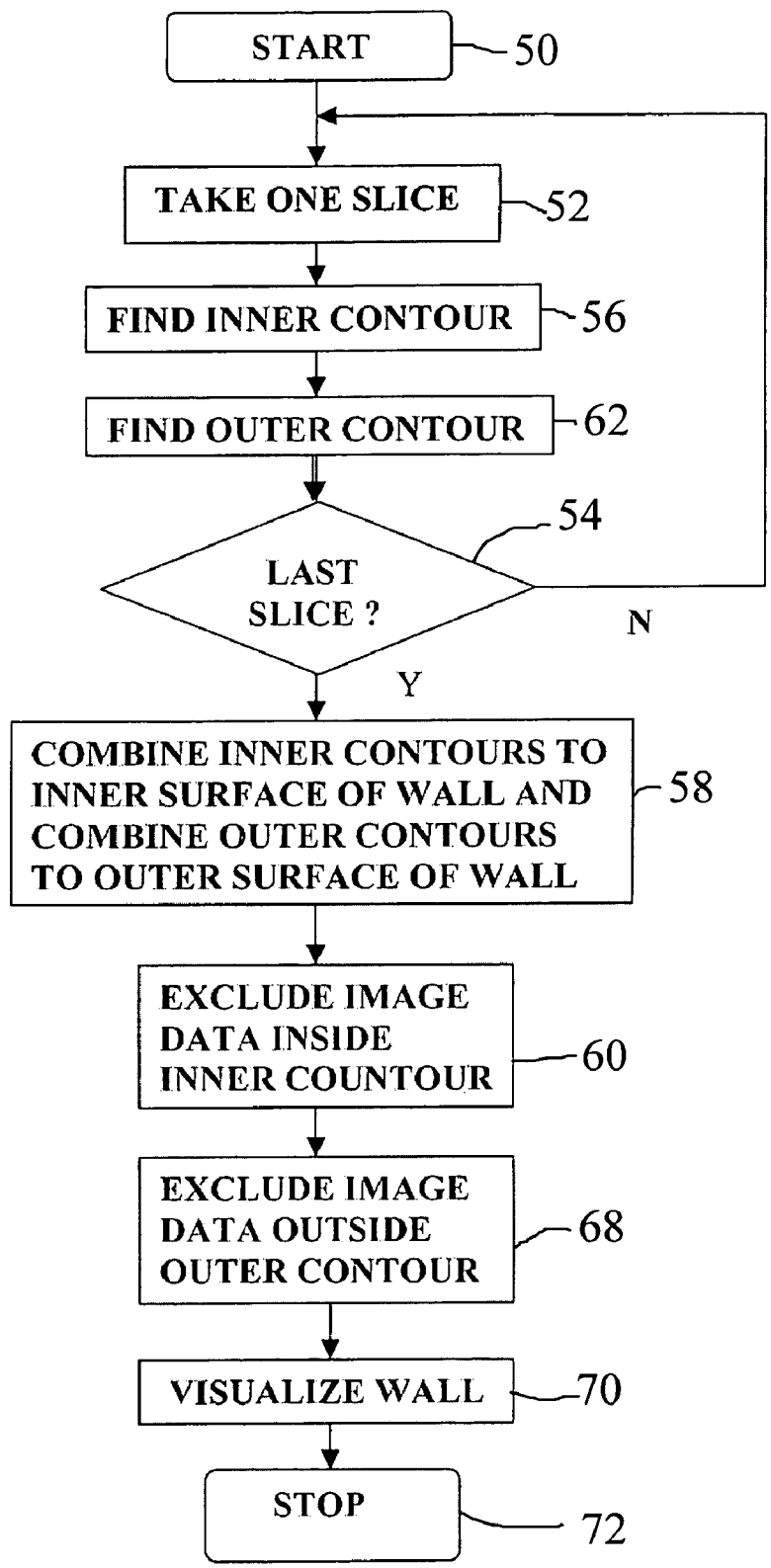
FIG. 4, a procedural block diagram according to the invention.

FIG. 4 illustrates a procedural block diagram according to the invention. In block 50, the procedure commences, and if appropriate, the necessary hardware and software facilities are assigned. In block 52, a first slice is measured according to conventional procedures. This may be either a long axis slice or a short axis slice.

Then, in block 56 the inner contour pertaining to the slice so measured recently is derived, whereby the operations discussed earlier with reference to FIG. 2 may be used.

Subsequently, in block 62 the outer contour of the slice measured recently is derived, whereby the operations discussed earlier with reference to FIG. 2 may be used. If appropriate, in a processing block not explicitly indicated and considered to be part of block 62, and following the detection of the epicardial contour, the newly established outer contour is extended outwardly to include a region that holds structures that are known to be outside, but only at a limited distance from the detected epicardial contour, such as for instance coronaries and bypass grafts. Approaches discussed earlier with reference to FIG. 2 may be used.

In block 54, the system detects whether all necessary slices have been measured and evaluated. If negative, the system reverts to block 52. In fact, in various situations, a quite limited number of slices could already be sufficient to identify a volume for which a new data acquisition would result in a quite improved visualization of the wall content. In case the original data set is used for the visualization of the wall, the image quality will increase along with an increased number of slices to improve the spatial resolution.

If the outcome of block 54 is positive, in block 58 the various inner contours are joined to an inner surface of the wall, and the various outer contours are joined to an outer surface of the wall.

Next, in block 60 all voxels in the inner space of the contour are excluded, and subsequently in block 68, all voxels in the outer space of the contour are excluded. Next, in block 70 all voxels located in the non-excluded part of the object space, and therefore, in the wall, are visualized. A procedure known as Maximum Intensity Projection (MIP) may be used for such visualization. Finally, in block 72 the process terminates.

By way of example and if appropriate, in a processing block not shown for clarity and which could lie immediately behind block 58, the outer surface is extended outwardly to include a region that could contain structures of interest known to be outside but close to the wall as for instance in case of the heart wall bypass grafts or the base of coronaries before being embedded in the hearth wall. This may be done by geometrical dilating, or by another, more refined method that allows for spatially non-uniform dilating.

The following pertinent comments are added to the foregoing procedural description, but which comments nevertheless represent general and exemplary explanations and information:

1. Whereas the referenced Cline prior art (U.S. Pat. No. 6,058,218) executes thresholding as an initial operation, the present invention selects the position of the inner contour on the basis of the slice statistics, which procedure is both automatic and more accurate than the prior art. A particular example is finding the intensity at a transition where a statistical minimum occurs in a histogram based on a selected subset of voxels only, such minimum then indicating the step-wise transition between the wall material and the content of the interior (usually, blood). Furthermore, the use of fuzzy connectiveness principles has been found an appropriate practical implementation of the invention. Even if for some reason a gap such as deriving from the aorta or a heart valve, would occur in the contour, a bridging operation for virtually closing the gap in question would be a straightforward action.

2. Similarly, the outer contour is determined in the present invention in its own right, whereas in contradistinction, the reference derives the second contour directly from the first-determined contour through geometrical dilating thereof. Dilating in the present invention, inasfar as it occurs, is a later procedural step after the outer contour has been set already, to include for instance a bypass located outside the heart proper and which resulted from earlier cardiac surgery. Note that the present invention works much better in the case of a varying thickness of the object wall. In particular, the dynamic sign determination combined with a minimum cost algorithm used in the practical implementation of the invention is an appropriate procedure to establish the outer wall.

3. The general procedure may be abbreviated as follows. First, start with 3D data stack of object. Next, restrict to global subvolume with object. Next, select single slice. Next, find gray value distribution of all pixels and establish the statistical distribution of the grayscale values. Next, separate the voxels inside the inner contour as based on their connectedness and based on their being part of a statistical group of voxels in the distribution. For improved accuracy, the data of multiple neighboring slices may be used. This results in the inner contour. A similar approach takes a sequence of long axis slices instead of short axis slices.

4. The outer contour in a slice is found through resampling the grayscale information in the slice along a radial line that originates from the center, such as a center of gravity of the inner contour. Next, the sign of the grayscale change outside the inner wall is detected, whilst also using the statistical grayscale distribution data used earlier for the inner contour. Calculating then the first and second derivatives and establishing a path with minimum cost such as conventional in a minimum cost algorithm is effected, and followed by optimizing with a smoothing filter. Also the latter method for establishing the outer contour has been presented as only an example. In many cases, a zero or near-zero in the second derivative along the radial line may be taken as an outer contour point.

5. If appropriate, extend the outer contour by a spatially uniform or non-uniform extension to make it possible to include structures that are known to be outside, but only at a limited distance from the outer surface, such as for instance including a bypass graft near the heart's wall.

6. Hereinafter, various specific approaches are presented that may be applied alone or in combination as an alternative to block 70 in FIG. 4. First, combine the inner and outer contours to visualize exclusively a 3D wall or shell.

7. Alternatively, visualize specifically the outside of the wall by deleting all voxel data located outside the wall and display the remaining data with a 3D display method commonly known in the medical/biological society. In particular, the invention offers a possibility to see the outer surface of an object under examination by looking from the outside to the data set. In the particular case of cardiology, this will render visible the coronaries of the heart's wall, without interference by other structures such as fatty or muscular tissue still further outside the heart's wall. This feature may be used with for instance CT and MR data sets.

8. Alternatively, visualize the content of only the wall by deleting all data both outside the outer surface and inside the inner surface of the wall with a 3D display rendering method or with projection methods like MIP (Maximum Intensity Projection). In the case of a heart's wall, coronary arteries will then be visible without disturbance from the inner data that compose the ventricle and from the outer data that may hold other arteries and veins that are not part of the heart proper, as well as bone structures, fatty tissue, and other structures that may obscure the visibility of the coronary arteries.

9. Alternatively, in the procedure of FIG. 3, block 70, extend the process by executing a new acquisition of image data by further measurement, while in particular through using the newly documented position of the wall found through the above procedures, to still further optimize the acquisition of one or more extra data sets that present optimized acquisition settings such as an optimum resolution and/or sensitivity for the object under examination. An example would be the MR acquisition of thin slices that are limited specifically to cover the content of the wall proper. This feature may be used in MR image acquisition, or more generally, in image acquisition machines that can acquire slices with unrestricted 3D orientation.

Various contour-finding algorithms or methods have been published, e.g. Rob J. van der Geest et al, Comparison Between Manual And Semiautomated Analysis of Left Ventricular Volume Parameters from Short-Axis MR Images, J. Computer Assisted Tomography, 21(5): 756-756 (1997). This publication applies the Hough transform used for estimating the long ventricle axis, and furthermore likelihood criteria for determining endocardial radius and myocardial wall thickness, for therefrom estimating the epicardial radius. Also, the final contour was computed therein through using a minimal cost contour detection.

The basic principles of fuzzy connectedness and minimum cost algorithms to detect the contours of structures in image data sets have been well documented in the literature.

Note that the present invention could also be used with CT, and in particular, be also used with various other medical environments than the heart, such as the combination of skull-brains-arteries, kidney, intestine, and other.

Summarizing the above, the steps for detecting the outer contour surface, combining both voxel intensities (voxel values) and relative positions (first and second derivatives) among voxel subsets, thereby allowing non-uniform spacing between an inner and outer contour, are in particular:

1. As seed entity, the detected endocardial contour is used. From this contour, a polar model is created, which may originate in the center of gravity of the inner contour. Next, the polar model is used to resample the image to yield new voxel positions.
2. Based on the resampled image, dynamic sign determinations along each resampled image line are evaluated to correct for inversion of the gray scale level derivatives at the assumed position of the outer border.
3. From a combination of first and second derivatives and statistical information used to derive the endocardial border, a cost image is derived.
4. Finally, a path is searched through this cost image and subsequently optimized to find a closed contour.

For detailed information on exemplary image processing steps described herein, see for instance Milan Sonka, et al, Image Processing, Analysis and Machine Vision, Chapman & Hall (1995), ISBN 0-412-45570-6, in particular Chapter 5.2, Edge Based Segmentation and more specifically paragraph 5.2.4 where the pages 136 through 149 describe the deriving of cost matrices and subsequent contour detection based on a Minimum Cost Algorithm.

Now, the present invention has hereabove been disclosed with reference to preferred embodiments thereof. Persons skilled in the art will recognize that numerous modifications and changes may be made thereto without exceeding the scope of the appended Claims. In consequence, the embodiments should be considered as being illustrative, and no restriction should be construed from those embodiments, other than as have been recited in the Claims.

The invention claimed is:

1. A method for visualizing a particular surface of an object volume in an overall medical/biological environment, said method comprising the following computer operated steps:

receiving a source image data set as pertaining to said overall environment;

establishing a first contour surface within said environment, and through using said first contour surface as seed data, establishing a second contour surface within said environment, said first and second contour surfaces collectively defining a target object volume;

by way of segmenting, excluding from said image data set all information pertaining to structures outside said target object volume; and displaying a visual representation of said target object based on nonexcluded information;

wherein said method includes establishing said second contour surface through combining both voxel intensities and relative positions among voxel subsets, thereby allowing non-uniform spacing between said first and second contour surfaces, and at least said second contour surface is used as a discriminative for said segmenting.

2. A method as claimed in claim 1, wherein:

a particular contour location is established through statistical evaluation of multi-valued intensities of a selected voxel subset that is geometrically adjacent to such contour location.

3. A method as claimed in claim 2, wherein:

such voxel subset is derived through data processing resampling executed on primary voxel values that are derived from said source image data set towards producing a geometrical configuration of a further subset of such voxels for then therefrom deriving such contour location.

4. A method as claimed in claim 2, wherein:

said displaying is effected through executing a 3D rendering method or a Maximum Intensity Projection of the content of said target object volume after executing said segmenting.

5. A method as claimed in claim 2, wherein:

said displaying is effected through, subsequent to the establishing of said first and second contour surfaces, executing a repeated deriving of a source image data set at an optimized acquisition setting for said target object volume, after executing said segmenting that is based on an outer surface of said target object, wherein said repeated deriving is directed substantially to non-excluded parts of said environment.

6. A method as claimed in claim 2, wherein:

said displaying is effected through executing said segmenting that retains a volume that is situated between an inner surface and an outer surface pertaining to said target object.

7. A method as claimed in claim 2, wherein:

said first contour surface is an inner contour surface of a hollow object, and said second contour surface relates to an outer contour surface of said hollow object.

8. A method as claimed in claim 7, wherein:

said establishing of an outer contour surface uses a local extending beyond an outer said contour as earlier found.

9. A method as claimed in claim 8, wherein:

said local extending is spatially non-uniform beyond an applicable said outer contour.

10. A method as claimed in claim 1, wherein:

at least one of said contour surfaces is an outer contour of a hollow object, and the establishing of said outer contour surface applies a minimum cost procedure.

11. A method as claimed in claim 7, wherein:

said hollow object is a human heart.

12. An apparatus being for visualizing an object volume in an overall medical/biological environment, said apparatus comprising data processing means that includes:

receiving means for receiving a source image data set as pertaining to said overall environment;

contour surface establishing means for establishing at least a first and a second contour surface within said environment, said first and second contour surfaces collectively defining a target object volume that is associated to a target object;

segmenting means for by way of segmenting, excluding from said image data set all information pertaining to structures out of said target object volume; and visualizing means for displaying a visual representation of said target object volume based on information not so excluded;

wherein said contour surface establishing means establishes said first and second contour surfaces in mutually separate procedures, whilst at least one of said first and second contours is determined through combining both voxel intensities and relative positions among voxel subsets and by using said second contour surface as being discriminative for said segmenting and visualizing.

13. An apparatus as claimed in claim 12, wherein:

said contour surface establishing means establishes a particular contour location through statistical evaluation of multi-valued intensities of a selected voxel subset that is geometrically adjacent to such contour location.

14. An apparatus as claimed in claim 13, wherein:

such voxel subset is derived through data processing resampling executed on primary voxel values that are derived from said source image data set towards producing a geometrical configuration of a further subset of such voxels for then therefrom deriving such contour location.

15. An apparatus as claimed in claim 13, wherein:

said visualizing means executes a 3D rendering method or a Maximum Intensity Projection method of the content of said target object volume after executing said segmenting.

* * * * *